2,982,053
METHOD OF REMOVING DISSOLVED WATER FROM 96 PERCENT SILICA GLASS

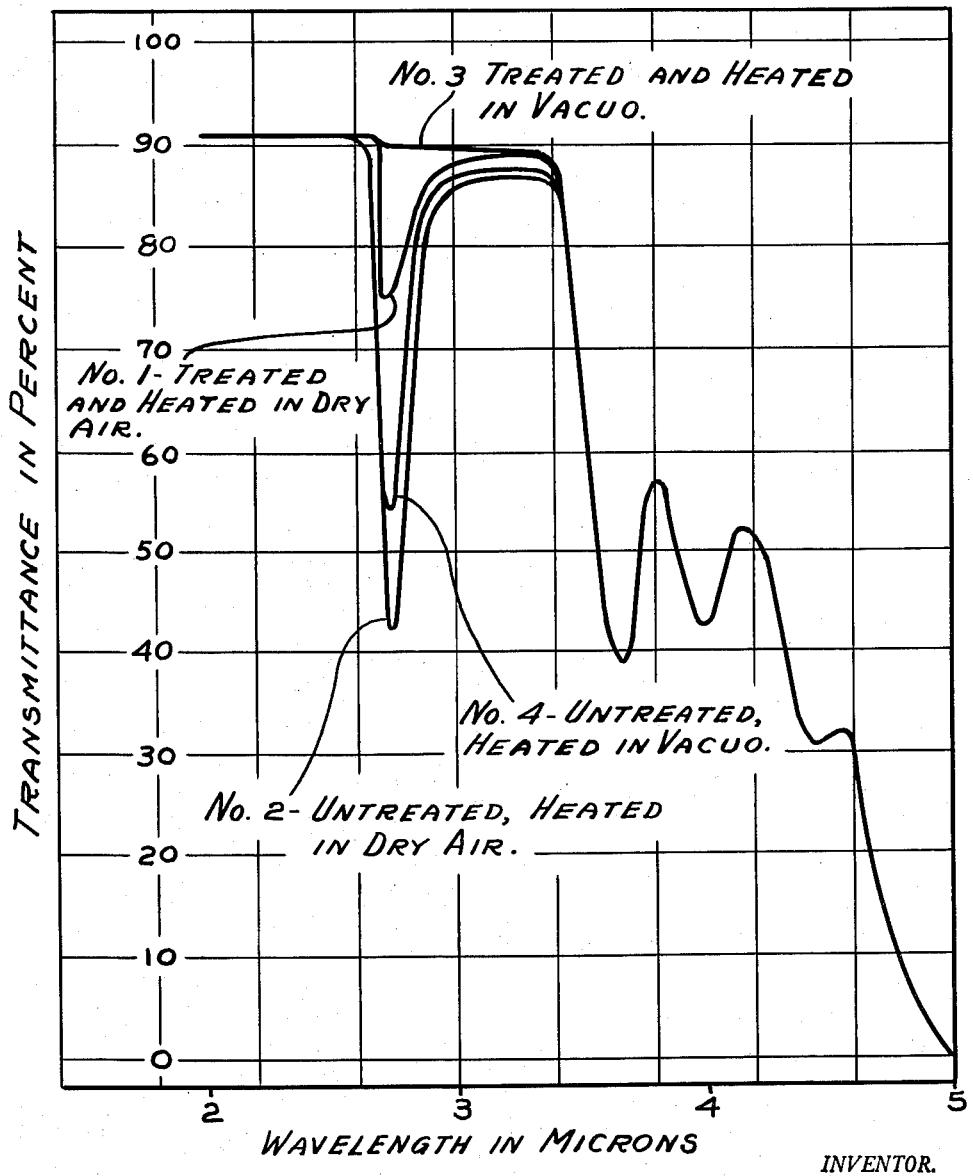

Thomas H. Elmer, Painted Post, N.Y., assignor to Corning Glass Works, Corning, N.Y., a corporation of New York Filed Nov. 19, 1956, Ser. No. 623,033

9 Claims. (Cl. 49—79)

This invention relates to the treatment of high silica glasses of the type disclosed in Patent No. 2,221,709 to remove minute amounts of water contained in their compositions and to adapt them for use as envelopes for high pressure mercury arc lamps operating at elevated temperatures and for other purposes wherein the presence of traces of water in the glass is objectionable.

According to the patent, an article composed of a glass containing over 94% $SiO_2$ is produced by melting and shaping a particular easily meltable glass of lower silica content and extracting therefrom soluble, non-siliceous constituents by leaching with a dilute acid to leave a highly siliceous structure retaining the original shape of the article and having a multiplicity of intercommunicating submicroscopic pores, which porous glass can be consolidated to a non-porous condition by heating it without fusion. Glasses resulting from such method are known in the art by the general designation "96% silica glasses" and will herein be so designated, it being understood, however, that the term is being used in a generic sense to include all glasses produced in accordance with the above-described process, irrespective of the exact silica content.

Such glasses are adapted for purposes requiring high thermal shock resistance and/or involving temperatures of 1000° C. or more. During prolonged use at elevated temperatures, however, various difficulties may be encountered. For example, the glasses may bubble when flame-worked, or the interior surface of heat-lamp bulbs made thereof may become blackened during use by deterioration of their tungsten filaments. Such effects are believed to be due to the evolution of water, small amounts of which are usually contained in the composition of the glass, because heating of the porous glass in a substantial vacuum during its consolidation, as shown in Patent No. 2,505,001, improves its characteristics in this respect and substantially increases the infrared transmittance of the glass at the well known absorption-band for wave lengths in the neighborhood of 2.72 microns. Such absorption-band normally appears in the infrared transmittance curves of pure water and of glasses in general and, in the latter, has been attributed to the presence of OH radicals in the constitution of the glass.

Even under the most favorable conditions, 96% silica glasses which have been heated under high vacuum during their consolidation are nevertheless unsuitable for envelopes for high pressure mercury arc lamps which operate at temperatures above red heat. During the operation of such a lamp composed of 96% silica glass, which has been consolidated in a vacuum, a progressive discoloration of the inside surface of the lamp envelope occurs accompanied by a steadily increasing difficulty in starting the lamp at normal voltage, and a general shortening of lamp life. This effect likewise is believed to be due to a minute trace of water in the glass which cannot be entirely removed by heating and consolidating the porous glass in vacuo, since the characteristic infrared absorption-band, above referred to, is not thereby entirely eliminated.

It is an object of the present invention to provide a method of treating a porous 96% silica glass prior to its consolidation whereby the above-described difficulties and disadvantages can be overcome and the glass can be rendered suitable for purpose requiring the substantial absence of water from its composition.

In accordance with the invention, there is provided a method of treating the porous glass to substantially decrease or eliminate water or OH radicals contained in the constitution of the glass and increase its transmittance for wave length 2.72 microns, which includes displacing OH radicals by treating or contacting it with a fluid comprising a fluorine-containing material, preferably a fluoride, and heating it, preferably in the absence of substantial ambient moisture as for example in anhydrous air or in a substantial vacuum.

For a better understanding of the invention, reference is had to the accompanying drawing which is a graph depicting four curves representing the infrared transmittance at wave lengths between 2 and 5 microns of 96% silica glass 1.2 mm. thick and showing the increase of transmittance between 2.6 and 3 microns resulting from treatments made according to the invention.

In carrying out the process of the invention any fluorine-containing material may be utilized which is substantially soluble or which can be vaporized or liquefied or decomposed at moderate temperatures, not exceeding about 1000° C., to provide a liquid or a gas containing fluorine either as combined or free fluorine. Fluorides, particularly those which leave no non-volatile residue in the pores of the glass during or after treatment, are especially desirable. Such fluorides may include HF, the ammonium fluorides, $NH_4F$ and $NH_4HF$, fluorides or chlorofluorides of the paraffin hydrocarbons, as $CH_3F$, $CHF_3$, $C_2H_5F$, $CCl_2F_2$ etc., fluorides of the aromatic hydrocarbons as $C_6H_5F$, and the like. Fluorides which may leave as a residue one of the constituents of the glass, such as, $SiF_4$, $(NH_4)_2SiF_6$, $BF_3$, and $AlF_3$, are also useful. For purposes for which it is not objectionable to introduce into the pores constituents not common to the glass, the metallic fluorides may be used.

Insofar as is known, only materials containing fluorine, are effective for the purpose of the invention. Chlorides, bromides, iodides, sulfates and the like are not effective.

Treatment of the porous glass with the fluorine-containing material may take place at or near room temperature or while the porous glass is being heated at elevated temperatures. For treatment at the lower temperature, the porous glass is saturated by immersion in a solution of a fluorine-containing material. The concentration of the fluorine-containing material in the solution is not especially critical but concentrations amounting to 0.5 to 5 wt. percent, computed as F, have been found suitable and convenient to use. The penetration of solutions into the porous glass can readily be observed through the edge of the glass and saturation of a thickness of 1 to 5 mm. is complete in about 1 to 30 minutes, thicker pieces requiring progressively longer times.

The saturated glass article is removed from the solution, the excess solution is quickly rinsed or wiped from the surface and the article is dried. It may be allowed to dry in air at room temperature or it may be dried more rapidly by raising it from room temperature to about 150° C. at a rate of about 25° C. per hour. It is then further heated and held between 900° and 1050° C. for 2 to 16 hours, or more, depending on thickness, to drive off and evaporate the residual water and is then heated at 1250° C. for about 20 minutes to complete the consolidation of the glass.

For treatment at elevated temperatures with gaseous fluorine-containing materials, the porous glass article is heated while the gaseous material is in contact therewith and the temperature is gradually raised to about 900° C. after which it is heated as described above.

To facilitate the elimination of OH radicals or water the final heating preferably is carried out in the absence of substantial ambient moisture, that is, in anhydrous air or in vacuo. Heating in vacuo is described in Patent No. 2,505,001 and is carried out in a vacuum furnace, the temperature being held between 900° and 1050° C. for about 1 to 16 hours, or even longer for very thick articles.

Merely heating and consolidating the untreated porous 96% silica glass in vacuo according to Patent No. 2,505,001 does not eliminate the absorption-band at 2.72 microns as is shown by curve 4 of the drawing for a thickness of 1.2 mm. Treatment of the porous glass with a fluoride according to this invention before heating it in vacuo, however, results in such a decrease of its water content that it has practically no infrared absorption at 2.72 microns even in a thickness of 6.5 mm. (It is well known that such absorption normally increases with the thickness of the glass.) The glass is thereby rendered suitable for purposes for which it was heretofore unsuitable, such as envelopes for high pressure mercury arc lamps and purposes requiring high transmittance between 2 and 3 microns.

During the early stages of heating the glass after it has been treated with $NH_4F$ solution, the odor of ammonia may be detected and it is presumed that the fluoride in the pores reacts to displace OH radicals from the silica network of the glass and replace them with fluorine. A substantial amount of fluorine, up to about 1 wt. percent remains in the treated consolidated glass, presumably combined in the network in place of OH, and it can be determined by the usual analytical procedure.

*Example 1*

Referring to the drawing, the curves, numbered 1 to 4 inclusive, represent measurements made with a Perkins-Elmer Model 21 infrared recording spectrophotometer of 4 dry porous glass specimens, 1.2 mm. thick, after they had been treated as follows:

Specimen 1, represented by curve 1, was saturated by 10 minutes immersion in a 5 wt. percent aqueous solution of $NH_4F$, quickly rinsed and allowed to dry in air at room temperature and was then heated, together with an untreated specimen, 2, as a blank represented by curve 2, to 1250° C. in anhydrous air at a gradually increasing rate of 25° to 250° C. per hour with holding times of 4 hours at 1000° C. to drive off water and 20 minutes at 1250° C. to complete the consolidation; specimen 3, represented by curve 3, was similarly immersed for 10 minutes in a 5 wt. percent aqueous solution of $NH_4F$ and dried and was then heated, together with an untreated specimen, 4, as a blank represented by curve 4, first in anhydrous air to 800° C. and then in a substantial vacuum (about 1 mm. of mercury) with holding times of one-half hour at 900° C., one hour at 1000° C., and 1 hour at 1050° C., to remove water, and 20 minutes at 1250° to complete consolidation.

As is shown by the curves 1 to 4, the so-called water absorption-band having a peak absorption at 2.72 microns is effected by the treatment of the invention. Specifically, the transmittance at 2.72 microns is increased by the treatment from 42% to 75% when the treated porous glass is heated only in anhydrous air, and is increased from 54% to 90% with complete elimination of the water absorption-band when the treated porous glass is subsequently heated in a substantial vacuum.

Such effect on the infrared absorption or the increase in the transmittance at 2.72 microns of the treated 96% silica glasses as compared to similar but untreated glasses dried and heated according to prior practice, is still more pronounced when the thickness of the glass is increased. For instance in comparison with the results shown by the curves, 2 specimens of 96% silica glass about 5 mm. thick, treated similarly to specimens 1 and 2 but with the more favorable holding times of ½ hour at 900° C., 1 hour at 1000° C., 1 hour at 1050° C., and 20 minutes at 1250° C., showed an increase in transmittance from 2% to 50% at 2.72 microns; and 2 specimens about 6.5 mm. thick, treated similarly to specimens 3 and 4 but with the still more favorable holding times of 8 hours at 930° C., 8 hours at 960° C. and 20 minutes at 1250 C., showed an increase in transmittance from 20% to 80% at 2.72 microns.

*Example 2*

A specimen of porous 96% silica glass about 1.5 mm. thick was treated by being immersed for 1.5 minutes in a 10 wt. percent aqueous solution of $NH_4HF$, rinsed with water, and allowed to dry in air at room temperature. It was then heated, together with a similar but untreated specimen as a blank, to about 800° C. The two specimens were further heated in vacuo to 1250° C. with holding times of one-half hour at 900° C., 1 hour at 1000° C., 1 hour at 1050° C. and 15 minutes at 1250° C. The transmittance measurements of the specimens showed that the water-absorption band of the treated specimen was absent and that its transmittance at 2.72 microns was increased by the treatment from 40% to 90% in comparison with the blank.

*Example 3*

A specimen 1.5 mm. thick of the glass referred to in Example 2 was treated by being immersed for 1.5 minutes in a 3 wt. percent aqueous solution of HF, rinsed with water with the excess blown off, and allowed to dry over night at room temperature. It was then heated, together with a similar but untreated specimen as a blank, first in air and then in vacuo in the manner set forth in Example 2. The transmittance measurements of the specimens showed that the water-absorption band of the treated specimen, although not entirely absent, was substantially so and that its transmittance at 2.72 microns had undergone an increase from 39% to 90%.

*Example 4*

A specimen of porous 96% silica glass 0.9 mm. thick was treated by being immersed for 10 minutes in an 8 wt. percent solution of $(NH_4)_2SiF_6$, rinsed with water, and dried in air at room temperature. It was then heated, together with a similar but untreated specimen as a blank, to about 800° C. followed by heating in vacuo in the manner described in Example 2. The transmittance measurements of the specimens showed that the water-absorption band of the treated specimen was absent while its transmittance at 2.72 microns was 91% as compared with 78% for the blank.

*Example 5*

This example demonstrates the effectiveness of the new method when the fluoride is introduced into the pores of the porous glass as a vapor, since the effective fluorides named above vaporize readily.

A specimen of porous 96% silica glass 0.9 mm. thick was inserted in a glass combustion tube having a volume of 180 cc. and they were heated up to 300° C. in about 1.5 hours. A current of dry air was then passed through the tube momentarily to sweep out accumulated moisture, if any, and a small porcelain boat containing 0.3 g. of $NH_4F$ was introduced into the tube without interrupting the heating. When the temperature reached 850° C., it was held for one half hour, after which the treated specimen was heated in vacuo in the manner described in Example 2.

A similar specimen of the same glass 0.9 mm. thick was utilized as a blank and was heated in a separate tube in the same manner concurrently with the treated specimen but without being exposed to fluoride vapors.

The transmittance measurements of the specimens showed that the water-absorption band of the treated specimen was absent with a transmittance of 90% at 2.72 microns as compared with 75% for the blank.

*Example 6*

A specimen of porous 96% silica glass 1.14 mm. thick was placed in a glass combustion tube within a small furnace and a stream of dry air was passed through the tube while the furnace was heated to 900° C. in 1.75 hours. To prevent subsequent oxidation effects a stream of dry nitrogen was then substituted for 5 minutes for the dry air in the tube after which gaseous dichlorodifluoro methane $CCl_2F_2$, was passed into and through the tube for ½ minute. After the flow of gas was shut off, the tube was left under atmospheric pressure at 900° C. for 15 minutes and then was transferred to a vacuum furnace where it was held for 45 minutes at 900° C., 1 hour at 1000° C., 1 hour at 1050° C., raised from 1050° to 1250° C. in 40 minutes, and held for 50 minutes at 1250° C.

A similar specimen of the same glass, 1.1 mm. thick, was utilized as a blank and was heated in a separate tube in the same manner concurrently with the treated specimen but without being treated with dichlorodifluoro methane.

After such treatments the transmittance measurements of the specimens showed that the water absorption band of the treated specimen was absent and its transmittance at 2.72 microns was 87% as compared with 55% for the blank.

What is claimed is:

1. The method of eliminating water from a glass article of high silica content having throughout its mass a multiplicity of submicroscopic intercommunicating pores, which includes displacing OH radicals by permeating it with a fluid comprising a fluorine-containing material and heating it to a temperature sufficient to close the pores.

2. The method of claim 1 in which the fluorine-containing material is a fluoride.

3. The method of claim 2 in which the fluoride is selected from the group consisting of $NH_4F$, $NH_4HF$, $(NH_4)_2SiF_6$ and HF.

4. The method of claim 1 in which the fluorine-containing material is in solution.

5. The method of claim 1 in which the fluorine-containing material is a vapor.

6. The method of claim 1 in which the article is heated in the absence of substantial ambient moisture.

7. The method of claim 6 in which the article is heated in anhydrous air.

8. The method of claim 6 in which the article is heated in vacuo.

9. An article comprising a non-porous 96% silica glass which has an infrared transmittance at 2.72 microns of at least 50% in a thickness of about 5 mm. and which contains up to 1.0 wt. percent of analytically determined fluoride computed as F.

References Cited in the file of this patent

UNITED STATES PATENTS

| | | |
|---|---|---|
| 2,038,691 | Taylor | Apr. 28, 1936 |
| 2,337,460 | French | Dec. 21, 1943 |
| 2,461,840 | Nicoll | Feb. 15, 1949 |
| 2,490,263 | Gaiser et al. | Dec. 6, 1949 |
| 2,505,001 | Nordberg | Apr. 25, 1950 |
| 2,532,691 | Berry | Dec. 5, 1950 |
| 2,662,065 | Berry | Dec. 8, 1953 |